(12) United States Patent
Fairbourn et al.

(10) Patent No.: US 11,053,578 B2
(45) Date of Patent: Jul. 6, 2021

(54) REMOVING COATINGS FROM CERAMIC MATRIX COMPOSITE SUBSTRATES

(71) Applicant: Rolls-Royce Corporation, Indianapolis, IN (US)

(72) Inventors: David C. Fairbourn, Sandy, UT (US); Sunny Chang, Carmel, IN (US); Johnny D. Grubbs, Clayton, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 337 days.

(21) Appl. No.: 15/786,057

(22) Filed: Oct. 17, 2017

(65) Prior Publication Data

US 2018/0112301 A1 Apr. 26, 2018

Related U.S. Application Data

(60) Provisional application No. 62/411,392, filed on Oct. 21, 2016.

(51) Int. Cl.
| | |
|---|---|
| *C23G 1/08* | (2006.01) |
| *C23G 1/10* | (2006.01) |
| *C23C 4/02* | (2006.01) |
| *F01D 5/28* | (2006.01) |
| *C04B 41/00* | (2006.01) |
| *C04B 41/53* | (2006.01) |
| *C04B 41/91* | (2006.01) |
| *F01D 5/00* | (2006.01) |

(52) U.S. Cl.
CPC .............. *C23C 4/02* (2013.01); *C04B 41/009* (2013.01); *C04B 41/5353* (2013.01); *C04B 41/91* (2013.01); *C23G 1/08* (2013.01); *C23G 1/10* (2013.01); *F01D 5/005* (2013.01); *F01D 5/288* (2013.01); *F05D 2300/6033* (2013.01)

(58) Field of Classification Search
CPC ... C04B 41/009; C04B 35/16; C04B 41/5353; C04B 41/91; C23C 4/02; C23G 1/08; C23G 1/10; F01D 5/005; F01D 5/288; F05D 2300/6033; B08B 3/08
See application file for complete search history.

(56) References Cited

U.S. PATENT DOCUMENTS

| 6,238,743 B1 | 5/2001 | Brooks |
| 6,294,072 B1 | 9/2001 | Fairbourn |

(Continued)

FOREIGN PATENT DOCUMENTS

| EP | 1013798 A2 | 6/2000 | |
| WO | WO-2009065449 A2 * | 5/2009 | ............. B08B 9/027 |

OTHER PUBLICATIONS

WO2009/065449A2 machine translation (Year: 2009).*

(Continued)

*Primary Examiner* — Douglas Lee
(74) *Attorney, Agent, or Firm* — Shumaker & Sieffert, P.A.

(57) ABSTRACT

A method for removing a coating including a rare earth silicate from a substrate including a ceramic or ceramic matrix composite may include contacting a coating comprising a rare earth silicate with a liquid comprising an active species. The active species may include at least one of a mineral acid or a base. The method also may include working the coating to cause removal of at least a portion of the coating.

12 Claims, 2 Drawing Sheets

(56) References Cited

U.S. PATENT DOCUMENTS

| | | | | |
|---|---|---|---|---|
| 6,428,683 B1* | 8/2002 | Jaworowski | ............ | C25F 1/00 |
| | | | | 204/227 |
| 6,660,102 B2* | 12/2003 | Jeutter | ............ | B08B 3/02 |
| | | | | 134/26 |
| 6,890,587 B2* | 5/2005 | Khan | ............ | C04B 41/009 |
| | | | | 427/142 |
| 7,083,824 B2* | 8/2006 | Stankowski | ............ | F01D 5/00 |
| | | | | 427/142 |
| 2009/0162539 A1 | 6/2009 | Boutwell et al. | | |
| 2010/0255260 A1* | 10/2010 | Lee | ............ | C04B 41/52 |
| | | | | 428/164 |
| 2014/0165783 A1* | 6/2014 | Monk | ............ | C22B 7/005 |
| | | | | 75/10.67 |
| 2014/0261080 A1* | 9/2014 | Lee | ............ | C04B 41/009 |
| | | | | 106/286.5 |
| 2015/0059802 A1* | 3/2015 | Weaver | ............ | F01D 5/288 |
| | | | | 134/2 |
| 2015/0114437 A1 | 4/2015 | Stewart | | |

OTHER PUBLICATIONS

Vernyi, "Remove Coatings From Turbine Components Without Damaging Them and Lower Your Costs," Welding Design and Fabrication, Springfield Manufacturing LLC and Huffman Corp., Feb. 1, 2009, 4 pp.

"Acid Stripping for Coating Removal." retrieved from http://www.diffusion-alloys.com/content/acid-stripping-coating-removal on Oct. 6, 2017, 2 pp.

Response to Extended Search Report dated Mar. 9, 2018, from counterpart European Application No. 17196016.4, filed Jul. 18, 2018, 5 pp.

Search Report from counterpart European Application No. 17196016.4, dated Mar. 9, 2018, 9 pp.

Notice of Intent to Grant and Text Intended to Grant from counterpart European Application No. 17196016.4, dated Dec. 11, 2020, 25 pp.

* cited by examiner

REMOVING COATINGS FROM CERAMIC MATRIX COMPOSITE SUBSTRATES

This application claims the benefit of U.S. Provisional Application No. 62/411,392 filed Oct. 21, 2016, which is incorporated herein by reference in its entirety.

TECHNICAL FIELD

The present disclosure generally relates to techniques for removing coatings from ceramic matrix composite substrates.

BACKGROUND

Environmental barrier coatings (EBCs) are used to protect ceramic matrix composite (CMC) substrates in environments in which the article may be exposed to high temperature water vapor. EBCs reduce exposure of the CMC substrate to the high temperature water vapor by forming a physical barrier between the external environment and the CMC substrate. Other coatings also may be used on CMC substrates, including abradable coatings, bond coatings, thermal barrier coatings, and the like.

SUMMARY

In some examples, the disclosure describes a method that includes contacting a coating including a rare earth silicate with a liquid including an active species. The coating is on a substrate that includes a ceramic or a ceramic matrix composite. The active species includes at least one of a mineral acid or a base. The method also may include working the coating to cause removal of at least a portion of the coating.

In some examples, the disclosure describes an assembly including a liquid that includes an active species including at least one of a mineral acid or a base; a container containing the liquid; and an article submerged in the liquid. The article includes a substrate including a ceramic or a ceramic matrix composite and a coating including a rare earth silicate on the substrate.

The details of one or more examples are set forth in the accompanying drawings and the description below. Other features, objects, and advantages will be apparent from the description and drawings, and from the claims.

DETAILED DESCRIPTION

Figure 1:
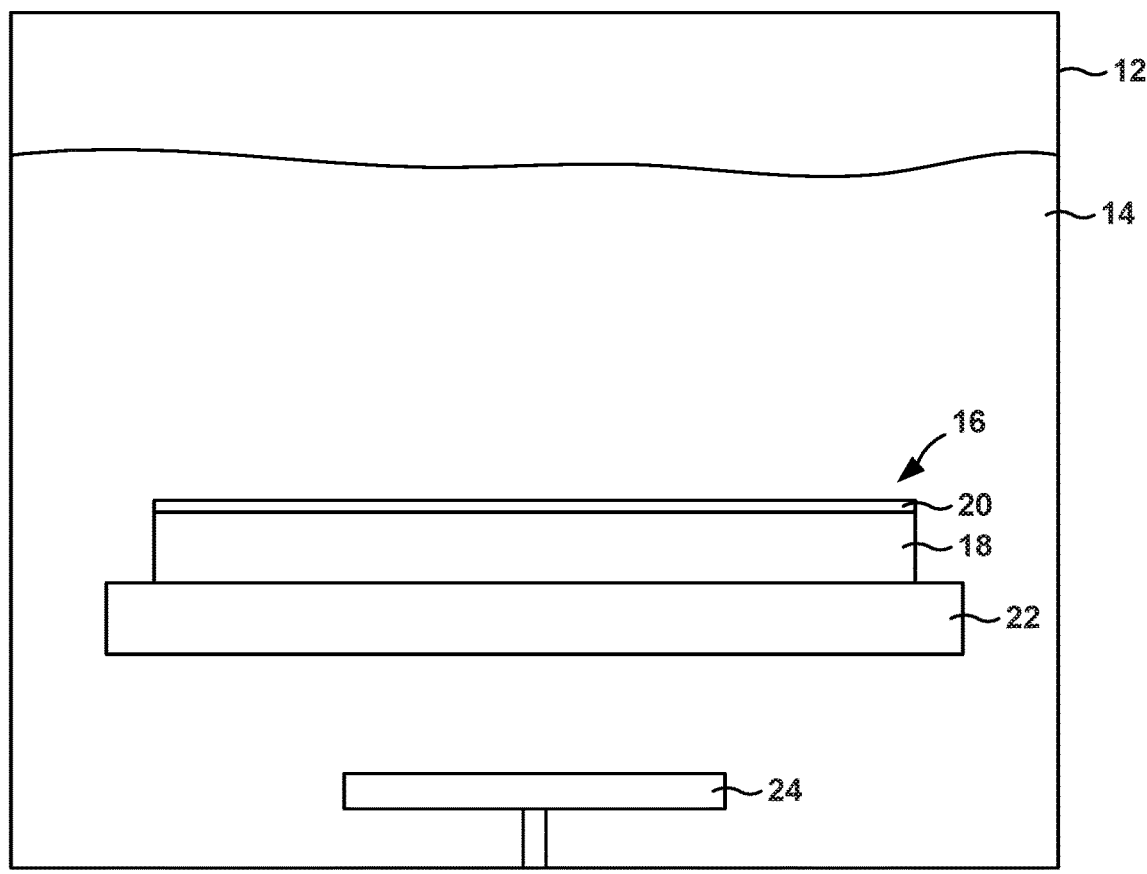
FIG. 1 is a conceptual diagram illustrating an example assembly for removing a coating that includes at least one rare earth silicate from a substrate that includes a ceramic or a CMC.

The disclosure describes techniques for removing coatings from underlying substrates that include a ceramic or a ceramic matrix composite (CMC). Coatings are used to protect substrates that include a ceramic or CMC in environments in which the article may be exposed to high temperatures, environmental species that may damage the ceramic or CM, such as water vapor, mechanical stresses, or the like. Depending on the application for which the substrate will be used, some substrates that include a ceramic or CMC may be coated with coatings such as an environmental barrier coating (EBC), an abradable coating, or the like. In some examples, the coating may include multiple layers, such as an EBC and an abradable coating, and may optionally include a bond coating to improve adhesion of overlying coatings to the substrate. If the underlying CMC substrate is damaged, for example due to foreign object impact (FOI), it may be useful to remove the coating from at least a portion of the substrate in order to repair the substrate.

Some EBCs and abradable coatings include or consist essentially of at least one rare earth silicate. Rare earth silicates may be inert to many chemicals, making chemical removal of coatings including at least one rare earth silicate difficult. Further, solely mechanical removal of coatings from a substrate including a ceramic or CMC may risk more extensive damage to the substrate, requiring further repairs, or even rendering the substrate unrepairable.

The techniques described herein utilize a liquid including an active species to remove a coating including a rare earth silicate from a substrate including a ceramic or CMC. The active species may include, for example, an acid or a base. The acid or base may be selected to interact with the rare earth silicate but to leave the ceramic or CMC in the substrate substantially intact. In some examples, the active species includes an acid, and may include hydrochloric acid (HCl), nitric acid ($HNO_3$), phosphoric acid ($H_3PO_4$), hydrobromic acid (HBr), hydroiodic acid (HI), sulfuric acid ($H_2SO_4$), sulfamic acid ($H_3NSO_3$), citric acid ($C_6H_8O_7$), acetic acid ($CH_3COOH$), oxalic acid ($C_2H_2O_4$), or the like. Bases may include, for example, sodium hydroxide. In some examples, the active species may include a mineral acid. Mineral acids may include, for example, hydrochloric acid (HCl), nitric acid ($HNO_3$), phosphoric acid ($H_3PO_4$), hydrobromic acid (HBr), hydroiodic acid (HI), sulfuric acid ($H_2SO_4$), sulfamic acid ($H_3NSO_3$), or the like. Contacting the coating with the liquid including active species such as these may facilitate removal of the coating while leaving the substrate substantially undamaged. For example, at least the coating may be submerged in the liquid including the active species.

In some examples, the techniques also may utilize an electrode submerged in the liquid including the active species. The electrode may have a natural potential ($E^0$) that is higher than the natural potential of the substrate. This may aid in establishing an electrochemical cell including the substrate, the electrode, and the liquid including the active species, which may accelerate the removal of the coating.

In some examples, the technique may further include removing a first portion of the coating prior to contacting the coating with the liquid including active species. The first portion of the coating may be removed using an abrasive material or a liquid jet, such as a water jet. Operating parameters for the abrasive material or the liquid jet, such as the pressure of the liquid jet and the time for which the abrasive material or liquid jet is directed at a location of the coating, may be selected to reduce or minimize risk of damage to the underlying substrate.

By removing a coating including a rare earth silicate from a substrate including a ceramic or CMC, the ceramic or CMC may be repaired. Further, in some examples, after removal, the rare earth element from the rare earth silicate may be recovered from the liquid, which may allow recycling of the rare earth element.

FIG. 1 is a conceptual diagram illustrating an example assembly 10 for removing a coating 20 that includes at least one rare earth silicate from a substrate 18 that includes a ceramic or a CMC. Assembly 10 includes a container 12 that contains a liquid 14, an article 16 that includes substrate 18 and coating 20, and, optionally, at least one of an electrode 22 or an agitator 24.

Container 12 encloses or contains liquid 14. Container 12 may be formed of any suitable material, such as any material that is substantially inert to liquid 14. In some examples, rather than being formed fully of a material that is substantially inert to liquid 14, container 12 may include a liner that is substantially inert to liquid 14. Container 12 may be sized and shaped based on the size and shape of article 16, or based on the size and shape of a number of articles 16 to be placed in container 12. In some examples, container 12 may contain sufficient liquid 14 to substantially fully submerge article 16 (or multiple articles 16) in liquid 14.

Liquid 14 may include an active species, and, optionally, a solvent or diluent. The active species may be selected to facilitate removal of coating 20, e.g., via formation of a coordination complex such as a Werner complex, or dissolution of constituents of coating 20 in liquid 14.

The solvent may include any liquid in which the active species may be mixed, suspended, or dissolved. In some examples, the solvent solvates the rare earth element, the rare earth silicate, or the coordination complex. For example, the solvent may include water, an alcohol, or another polar solvent.

In some examples, the active species may include an acid, such as citric acid ($C_6H_8O_7$), acetic acid ($CH_3COOH$), oxalic acid ($C_2H_2O_4$), a mineral acid, or a base. Mineral acids may include, for example, hydrochloric acid (HCl), nitric acid ($HNO_3$), phosphoric acid ($H_3PO_4$), hydrobromic acid (HBr), hydroiodic acid (HI), sulfuric acid ($H_2SO_4$), sulfamic acid ($H_3NSO_3$), or the like. Bases may include, for example, sodium hydroxide.

The liquid may include the active species in any selected concentration, as measured in molarity, molality, volume percent, weight percent, or the like. The concentration of the active species may be selected to be sufficient to facilitate removal of coating 20 while leaving substrate 18 substantially undamaged. The concentration of the active species also may be selected based on the identity of the active species. For example, the concentration of the active species may be at least about 0.1 molar (M), such as at least about 2 M, between about 5 molar (M) and about 10 molar (M), or the like. In some examples, such as some examples in which the active species is a base, the liquid may not be saturated with the active ingredient. Some specific examples include, for example, between about 5 M and about 10 M hydrochloric acid in water, between about 5 M and about 10 M nitric acid in water, and the like.

Article 16 includes substrate 18 and coating 20. In some examples, article 16 may be a component of a high temperature mechanical system, such as a gas turbine engine. For example, article 16 may include a combustor line, a turbine blade, a turbine shroud, a turbine vane, a turbine flap, a turbine seal, or the like.

Substrate 18 may include a ceramic or a CMC. In examples in which substrate 18 includes a ceramic, substrate 18 may include, for example, silicon carbide (SiC), silicon nitride ($Si_3N_4$), alumina ($Al_2O_3$), aluminosilicate (e.g., $Al_2SiO_5$), silica ($SiO_2$), molybdenum carbide ($Mo_2C$), or the like.

In examples in which substrate 18 includes a CMC, substrate 18 may include a reinforcement material and matrix material. The reinforcement material may include any of a variety of configurations including, but not limited to, discontinuous forms such as whiskers, platelets, or particulates, or continuous forms, such as a continuous monofilament or multifilament weave. The matrix material may substantially surround or encapsulate the reinforcement material. Each of the reinforcement material and the matrix material may include silicon carbide (SiC), silicon nitride ($Si_3N_4$), alumina ($Al_2O_3$), aluminosilicate (e.g., $Al_2SiO_5$), silica ($SiO_2$), molybdenum carbide ($Mo_2C$), or the like. In some examples, the reinforcement material and the matrix material may be the same. In other examples, the reinforcement material may be different than the matrix material. In some examples, substrate 18 may include a SiC reinforcement material and a SiC matrix material or a Si—SiC matrix material.

Coating 20 may include any coating that includes at least one rare earth silicate. In some examples, coating 20 includes at least one of an environmental barrier coating (EBC) or an abradable coating. In some examples, a single coating 20 may perform multiple functions or a single coating 20 includes multiple layers, each of which performs one or more function. For example, an EBC may provide environmental protection and thermal protection to substrate 18.

In some examples, coating 20 may include a bond coat that includes any useful material to improve adhesion between substrate 18 and subsequent layers applied to the bond coat. For example, the bond coat may be formulated to exhibit desired chemical or physical attraction between substrate 18 and any subsequent coating or layer applied to the bond coat. In some examples, the bond coat may include silicon metal, alone, or mixed with at least one other constituent including, for example, at least one of a transition metal carbide, a transition metal boride, or a transition metal nitride. Representative transition metals include, for example, Cr, Mo, Nb, W, Ti, Ta, Hf, or Zr. In some examples, the bond coat may additionally or alternatively include mullite (aluminum silicate, $Al_6Si_2O_{13}$), silica, a silicide, or the like, alone, or in any combination (including in combination with one or more of silicon metal, a transition metal carbide, a transition metal boride, or a transition metal nitride).

Additionally or alternatively, coating 20 may include an EBC, which may provide environmental protection, thermal protection, and/or calcia-magnesia-aluminosilicate (CMAS)-resistance to substrate 18. An EBC may include materials that are resistant to oxidation or water vapor attack, and/or provide at least one of water vapor stability, chemical stability and environmental durability to substrate 18. In some examples, the EBC may be used to protect substrate 18 against oxidation and/or corrosive attacks at high operating temperatures. An EBC coating may include at least one rare earth silicate. The at least one rare earth silicate may include at least one rare earth monosilicate ($RE_2SiO_5$, where RE is a rare earth element), at least one rare earth disilicate ($RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth element is Yb.

In some examples, in addition to the at least one rare earth silicate, the EBC may include at least one of a free rare earth oxide, an aluminosilicate, or an alkaline earth aluminosilicate. For example, an EBC coating may include mullite, barium strontium aluminosilicate (BSAS), barium aluminosilicate (BAS), strontium aluminosilicate (SAS), at least one free rare earth oxide, or combinations thereof. In some examples, an EBC coating may include an additive in addition to the primary constituents of the EBC coating. For example, an EBC coating may include at least one of $TiO_2$, $Ta_2O_5$, $HfSiO_4$, an alkali metal oxide, or an alkali earth metal oxide. The additive may be added to the EBC coating to modify one or more desired properties of the EBC coating. For example, the additive components may increase or decrease the reaction rate of the EBC coating with CMAS, may modify the viscosity of the reaction product from the reaction of CMAS and the EBC coating, may increase adhesion of the EBC coating to substrate 18, may increase or decrease the chemical stability of the EBC coating, or the like.

In some examples, the EBC coating may be substantially free (e.g., free or nearly free) of hafnia and/or zirconia. Zirconia and hafnia may be susceptible to chemical attack by CMAS, so an EBC coating substantially free of hafnia and/or zirconia may be more resistant to CMAS attack than an EBC coating that includes zirconia and/or hafnia.

In some examples, the EBC coating may have a dense microstructure, a columnar microstructure, or a combination of dense and columnar microstructures. A dense microstructure may be more effective in preventing the infiltration of CMAS and other environmental contaminants, while a columnar microstructure may be more strain tolerant during thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, an EBC coating with a dense microstructure may have a porosity of less than about 20 vol. %, such as less than about 15 vol. %, less than 10 vol. %, or less than about 5 vol. %, where porosity is measured as a percentage of pore volume divided by total volume of the EBC coating.

Additionally or alternatively, coating 20 may include an abradable layer. The abradable layer may include at least one rare earth silicate, which may include at least one rare earth monosilicate, at least one rare earth disilicate, or both. In some examples, in additional to the at least one rare earth silicate, the abradable layer may include at least one of a free rare earth oxide, an aluminosilicate, or an alkaline earth aluminosilicate. For example, an EBC coating may include mullite, barium strontium aluminosilicate (BSAS), barium aluminosilicate (BAS), strontium aluminosilicate (SAS), at least one free rare earth oxide, or combinations thereof.

The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

In some examples, coating 20 may include an abradable layer on an EBC layer. The EBC layer may be directly on substrate 18, or a bond layer may be between substrate 18 and the EBC layer. The abradable layer and the EBC layer may include ytterbium silicate, such as ytterbium disilicate.

In some examples, assembly 10 may optionally include an electrode 22. Electrode 22 may be electrically connected to substrate 18, either by direct physical contact as shown in FIG. 1, or indirectly via an intermediate structure, such as an electrically conductive lead or wire. Further, electrode 22 may be at least partially submerged in liquid 14. Electrode 22 may include an electrically conductive material that has a higher natural potential ($E^0$) than the material from which substrate 18 is formed. For example, electrode 22 may include graphite, such as AXF-5Q or grade XT from GraphiteStore.com (GraphiteStore.com, Inc., Buffalo Grove, Ill.), HASTELLOY® C-276, which is a nickel-chromium-molybdenum alloy, platinum, palladium, niobium-expanded mesh coated with platinum, such as DCX 125 (125µ-inch platinum over double-clad expanded niobium) (available commercially from Vincent Metals, Canonchet, R.I.), platinized titanium (titanium (expanded mesh or non-mesh) plated with platinum, then heat treated to diffuse/disperse the platinum onto and into the titanium). HASTELLOY® C-276 is a nickel-based, corrosion-resistant alloy comprising between about 15 and about 19 weight percent Mo, between about 14.5 and about 16.5 weight percent Cr, between about 4 and about 7 weight percent Fe, between about 3 and about 4.5 weight percent W, less than about 2.5 weight percent Co, less than about 1 weight percent Mn, less than about 0.02 weight percent C, less than about 0.35 weight percent V, less than about 0.03 weight percent P, less than about 0.03 weight percent S, and less than about 0.08 weight percent Si.

In some examples, as shown in FIG. 1, electrode 22 may also support article 16 in container 12. In other examples, assembly 10 may include a separate support for article 16. In some examples, the support may be electrically conductive, and in some examples, may have a natural potential ($E^0$) that is greater than the natural potential ($E^0$) of substrate 18.

Assembly 12 also may optionally include agitator 24. Agitator 24 may include a mechanism for stirring or otherwise agitating liquid 14. For example, agitator 24 may include a magnetic stirrer, a pump that adds and extracts liquid 14 from container 12 to effect mixing of liquid 14, or the like. In some examples, agitator 24 may include a system that removes liquid 14 from container 12, heats the removed liquid 14, filters the removed liquid 14, and returns the heated and filtered liquid 14 to container 12, e.g., via a sparger. Agitating liquid 14 may accelerate removal of coating 20 from substrate 18 by mixing liquid 14 to provide a more consistent concentration of the active species at the surface of coating 20.

Although not shown in FIG. 1, in some examples, assembly 10 may optionally include a heater. The heater may be configured to heat liquid 14 at or to a selected temperature. The selected temperature may be a temperature that facilitates or accelerates removal of coating 20. Additionally, in some examples, the temperature may be selected to be a temperature that substantially prevents boiling or vaporization of the active species in liquid 14. For example, the temperature may be between about 30° C. and about 80° C., such as between about 30° C. and about 50° C., or between about 50° C. and about 80° C.

Figure 2:
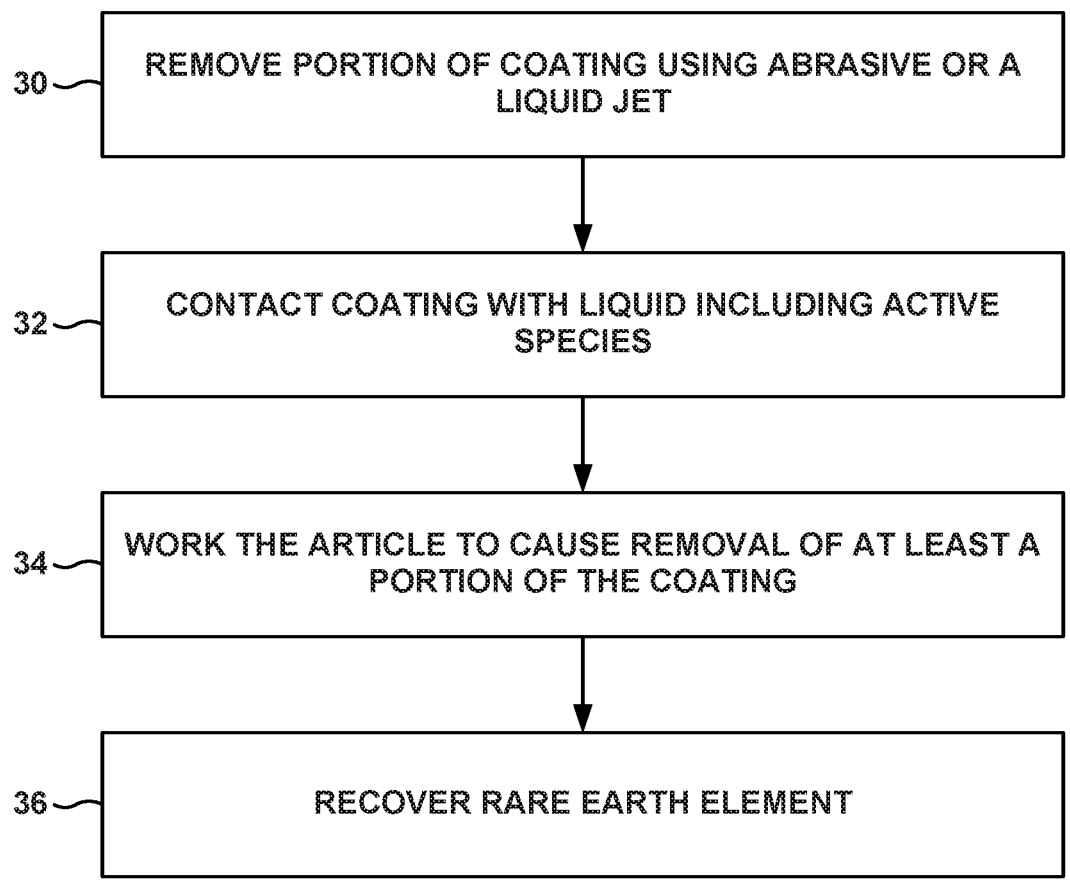
FIG. 2 is a flow diagram illustrating an example technique for removing a coating that includes at least one rare earth silicate from substrate that includes a ceramic or a CMC.

FIG. 2 is a flow diagram illustrating an example technique for removing coating 20 from substrate 18. The technique of FIG. 2 will be described with respect to assembly 10 of FIG. 1, although it will be appreciated that the technique of FIG. 2 may be performed by another assembly 10, and assembly 10 may perform other techniques.

The technique of FIG. 2 includes optionally includes removing a portion of coating 20 using an abrasive material or a liquid jet (30). For example, in instances in which coating 20 includes multiple layers or a relatively large thickness, removing a portion of coating 20 using an abrasive material or a liquid jet (30) may reduce the time required to remove coating 20 from substrate 18. Abrasive materials that may be used include, for example, glass beads, such as BALLOTINI® impact beads available from Potters® Industries Inc. Valley Forge, Pa., ceramic beads or powder, or other media that may be used for grit blasting. The liquid may include, for example, water, alone or in combination with an abrasive material.

In examples that include removing a portion of coating 20 using an abrasive material or a liquid jet (30), the pressure at which the liquid jet or abrasive material is directed at coating 20, the movement of the tool directing the abrasive material or liquid jet at coating 20, and the time for which the abrasive material or liquid jet is directed at a location of coating 20 may be controlled to reduce or substantially avoid abrading through the thickness of coating 20 and damaging substrate 18. As such, in some examples, removing a portion of coating 20 using an abrasive material or a liquid jet (30) may include removing less than an entire thickness of coating 20 using the abrasive material or liquid jet.

The pressure of at which the liquid jet or abrasive material is directed at coating 20 may affect the rate at which the liquid jet or abrasive material removes material from coating. In some examples, a pressure that is too high may reduce controllability of the amount of coating 20 that is removed, and may result in the liquid jet or abrasive material removing an entire thickness of coating 20 at a location and damaging substrate 18. As such, in some examples, and depending on the configuration of coating 20 (e.g., thickness of coating 20, number of layers in coating 20, composition of coating 20 or each layer of coating 20), the pressure of the abrasive material or the liquid jet may be controlled to be less than a predetermined value. The pressure may be the pressure at which the stream of abrasive material or the liquid jet leaves the tool. In some examples, the pressure may be less than 10,000 psi (about 68,948 kilopascals (kPa), as 10,000 psi may result in damage to substrate 18 in addition to removal of coating 20. In some examples, the pressure may be greater than about 100 psi (about 689 kPa), as such pressure may result in removal of material from coating 20. In some examples, the pressure may be between about 100 psi (about 689 kPa) and about 5,000 psi (about 34,474 kPa).

In some examples, coating 20 may include multiple layers, such as an abradable layer on an EBC layer, with or without a bond coat between substrate 18 and the EBC layer. In some such examples, removing a portion of coating 20 using an abrasive material or a liquid jet (30) may include removing at least a portion of the outer layer of coating 20, e.g., removing at least a portion of the thickness of the abradable layer using the abrasive material or the liquid jet (30). For example, the abrasive material or the liquid jet may be used to remove substantially an entire thickness of at least the outer layer of coating 20 (e.g., an abradable layer), with or without removing a portion of a thickness of an underlying layer (e.g., an EBC layer).

The technique of FIG. 2 also includes contacting coating 20 with liquid 14, which includes an active species (32). In some examples, as shown in FIG. 1, contacting coating 20 with liquid 14 (32) may include at least partially submerging article 16 in liquid 14, such as fully submerging article 16 in liquid 14. In other examples, contacting coating 20 with liquid 14 (32) may include directing a stream of liquid 14 at coating 20.

In some examples, contacting coating 20 with liquid 14 (32) may include heating liquid 14 at or to a predetermined temperature, such as between about 30° C. and about 80° C. Heating liquid 14 at or to a predetermined temperature may accelerate removal of coating 20 from substrate 18 compared to using liquid 14 at ambient temperature.

In some examples, contacting coating 20 with liquid 14 (32) may include agitating liquid 14 with agitator 24. In some examples, agitator 24 may include a system that removes liquid 14 from container 12, heats the removed liquid 14, filters the removed liquid 14, and returns the heated and filtered liquid 14 to container 12, e.g., via a sparger. Agitating liquid 14 may result in more homogeneous distribution of the active species throughout liquid 14, even as the active species interacts with coating 20 to facilitate removal of coating 20 from substrate 18.

In some examples, contacting coating 20 with liquid 14 (32) may include periodically or substantially continuously replacing or replenishing liquid 14 with active species or fresh liquid 14. Over time, the active species interacts with coating 20, which may leave less active species in liquid 14. By periodically or substantially continuously replacing or replenishing liquid 14 with active species or fresh liquid 14, a more constant concentration of active species may be present within liquid 14, such as adjacent to coating 20, which may maintain or improve a rate at which the active species interacts with coating 20 to facilitate removal of coating 20.

In some examples, contacting coating 20 with liquid 14 (32) may include electrically connecting substrate 18 and electrode 22. For example, substrate 18 may be in direct physical contact with electrode 22, as shown in FIG. 1, or may be electrically connected to electrode 22 via a wire or other electrically conductive lead. Electrode 22 may include a material that has a higher natural potential ($E^0$) than substrate 18. This may facilitate the electrochemical process by which the active species interacts with coating 20 and may accelerate the removal of coating 20 compared to examples in which electrode 22 is not used.

The technique of FIG. 2 further includes working article 16 to cause removal of at least a portion of coating 20 (34). For example, article 16 may be worked from time to time (e.g., periodically) after being contacted with liquid 14 (32). It is currently understood that the active species in liquid 14 interacts with coating 20 to form a coordinating complex of the acid anion and the rare earth element. This coordinating complex may be relatively soft and have relatively low adhesion to substrate 18. By working article 16 to cause removal of at least a portion of coating 20 (34), at least some of the coordinating complex may be removed from article 16, exposing additional coating 20 or substrate 18.

In some examples, article 16 may be worked once after contacted coating 20 with liquid 14 (32) for a predetermined time. The predetermined time may be sufficient to cause substantially all of coating 20 to form the coordinating complex, and working article 16 may result in removal of substantially all of coating 20 in a single working step. In other examples, article 16 may be worked from time to time (e.g., periodically) to remove the coordinating complex, which removes part of coating 20, and exposes additional coating 20 to liquid 14. This may reduce an amount of time used to remove coating 20, as the active species no longer needs to diffuse through the coordinating complex to reach coating 20. In some examples, after each working of article 16, article 16 may be submerged in fresh liquid 14.

Working article 16 to cause removal of at least a portion of coating 20 (34) may include contacting coating 20 and any coordinating complex with a tool, such as an abrasive material, a scraper, or the like, to cause removal of the coordinating complex, and possible some of coating 20, from article 16. For examples, steel wool, sandpaper, abrasive sponges, abrasive spheres, or the like may be used to work article 16 (34). In some examples, the material removed from article 16 during working of article may be collected so that the rare earth element in this material may later be recovered.

In some examples, the technique of FIG. 2 optionally includes recovering the rare earth element removed from coating 20 (36). The rare earth element may be recovered from liquid 14, the material worked from article 16, or both.

For example, liquid 14 may include some rare earth element in the form of rare earth element in a coordinating complex with anions from the active species. To recover the rare earth element from liquid 14, liquid 14 may first be heated to remove excess active species from liquid 14 and form a concentrate. For example, liquid 14 may be heated to temperature sufficient to remove excess active species while leaving at least some of the solvent. In some examples, the temperature at which liquid 14 is heated may be at least about, for example, 80° C.

Once excess active species has been removed from liquid 14 to form a concentrate, the concentrate may be filtered through a filtration media, such as a porous film or membrane. In some examples, the filtration media may include a polypropylene film or membrane, such as a porous polypropylene anode bag. The pore size may be selected to allow the solvent and any remaining active species to flow through the pores while preventing substantially all of the coordinating compound or rare earth element from passing through the pores. In some examples, the pore size may be between about 3 micrometers and about 5 micrometers. The material remaining after filtration may be referred to as a residue, and may include the rare earth element or coordinating compound, some solvent, and some active species.

In some examples, the residue then may be heated to drive off remaining solvent and active species. In some examples, the residue may be distilled, and the material remaining in the still may include the rare earth element. In some examples, the rare earth element may be in a salt form, e.g., a rare earth chloride is hydrochloric acid was used as the active species.

In some examples, in addition to or instead of recovering the rare earth element from liquid 14, the rare earth element may be recovered form the material worked from article 16, e.g., from the coordinating complex. For example, the material worked from article 16 may be heated to drive off remaining solvent and active species. In some examples, the residue may be distilled, and the material remaining in the still may include the rare earth element. In some examples, the rare earth element may be in a salt form, e.g., a rare earth chloride is hydrochloric acid was used as the active species.

Various examples have been described. These and other examples are within the scope of the following claims.

The invention claimed is:

1. A method comprising:
   removing a portion of a coating using an abrasive material or a liquid jet, wherein the coating comprises a rare earth silicate, and wherein the coating is on a substrate comprising a ceramic or ceramic matrix composite;
   after removing the portion of the coating using the abrasive material or the liquid jet, contacting the coating with a liquid comprising an active species, wherein the active species comprises a mineral acid, and wherein the mineral acid comprises at least one of hydrochloric acid (HCl), nitric acid (HNO$_3$), phosphoric acid (H$_3$PO$_4$), hydrobromic acid (HBr), hydroiodic acid (HI), sulfuric acid (H$_2$SO$_4$), or sulfamic acid (H$_3$NSO$_3$); and
   working the coating to cause removal of at least a portion of the coating.

2. The method of claim 1, wherein the liquid jet comprises a water jet at a pressure of between about 100 pounds per square inch (psi) and about 5,000 pounds per square inch (psi).

3. The method of claim 1, further comprising, while contacting the coating comprising the rare earth silicate with the liquid, agitating the liquid.

4. The method of claim 1, further comprising, while contacting the coating comprising the rare earth silicate with the liquid, electrically connecting the substrate to an electrode submerged in the liquid, wherein the electrode has a greater natural potential than the substrate.

5. The method of claim 4, wherein the electrode comprises at least one of graphite, gold, platinum, or a nickel-based corrosion resistant alloy.

6. The method of claim 1, further comprising heating the liquid at a temperature between about 30° C. and about 80° C.

7. The method of claim 1, wherein the rare earth silicate comprises a rare earth monosilicate or a rare earth disilicate.

8. The method of claim 1, wherein the rare earth silicate comprises a ytterbium silicate.

9. The method of claim 1, wherein the substrate comprises at least one of a SiC/SiC ceramic matrix composite or a SiC/Si—SiC ceramic matrix composite.

10. The method of claim 1, further comprising:
    after contacting the coating comprising the rare earth silicate with liquid, recovering a rare earth element removed from the coating.

11. The method of claim 10, wherein recovering the rare earth element removed from the coating comprises:
    heating the liquid to remove excess active species and form a concentrate;
    filtering the concentrate through a filter to obtain filtered residue; and
    distilling the filtered residue to recover the rare earth element.

12. The method of claim 11, wherein the recovered rare earth element is in salt form.

* * * * *